(No Model.) T. J. HAMLET. 5 Sheets—Sheet 3.
HARVESTER.
No. 496,358. Patented Apr. 25, 1893.
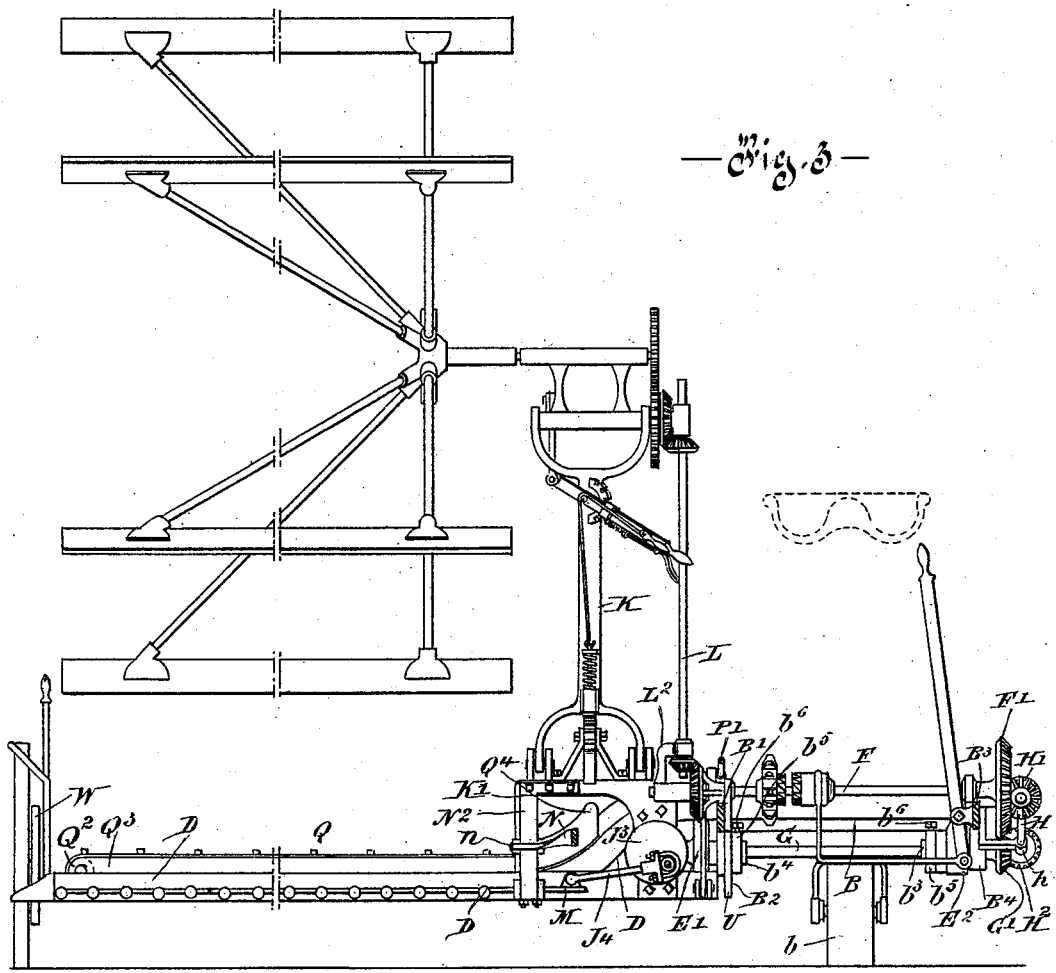

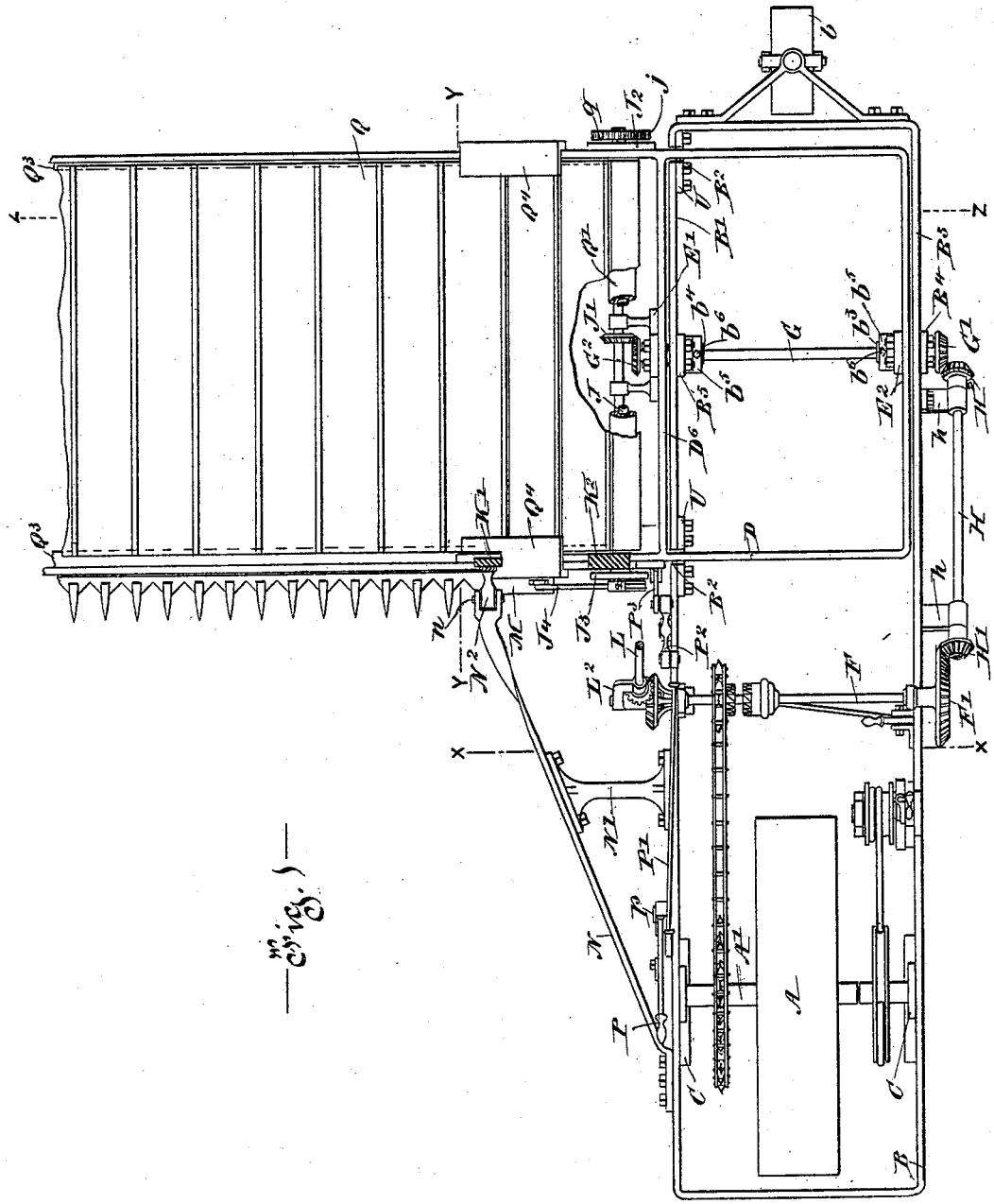

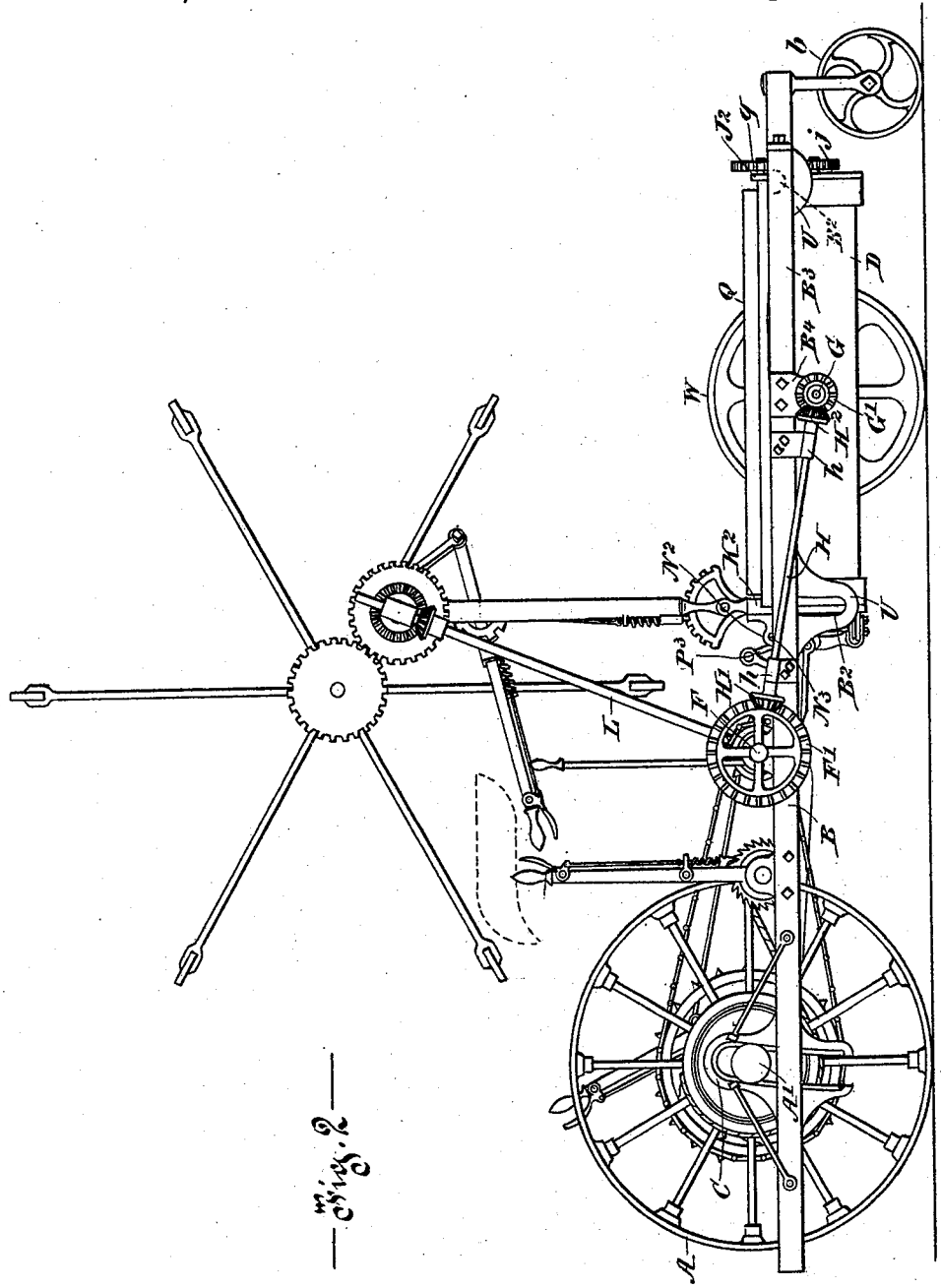

(No Model.) 5 Sheets—Sheet 4.
T. J. HAMLET.
HARVESTER.
No. 496,358. Patented Apr. 25, 1893.
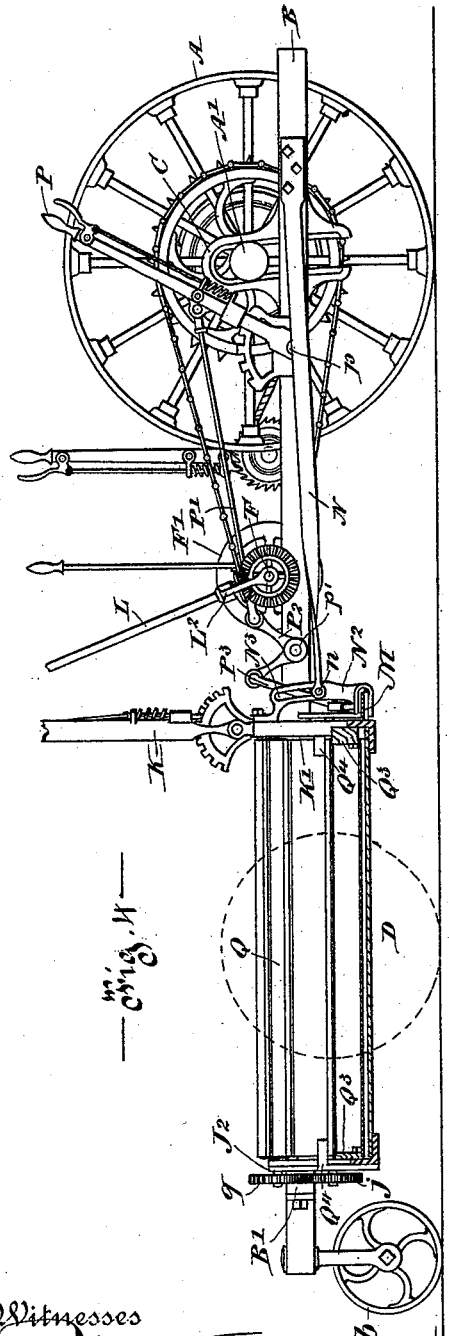
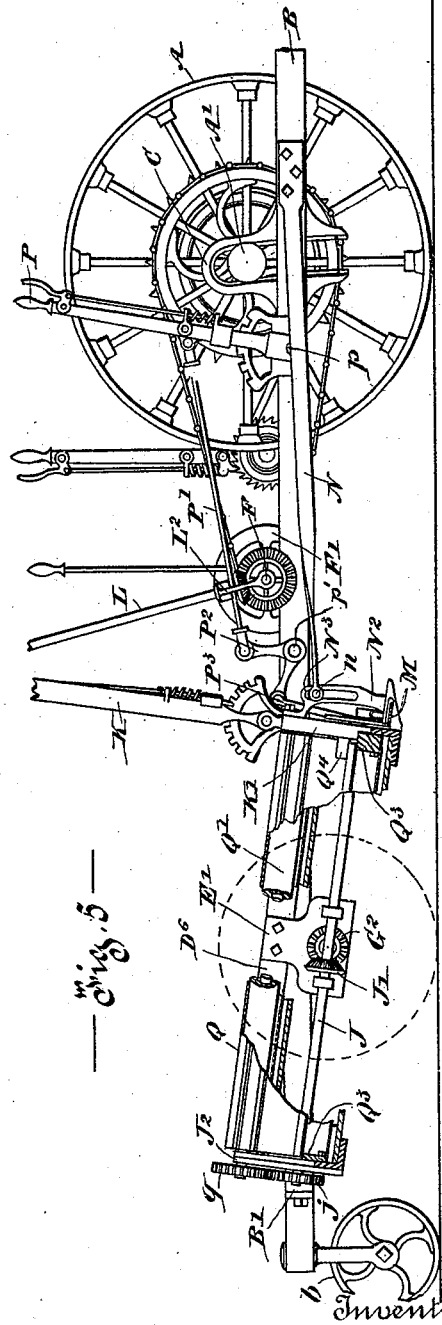

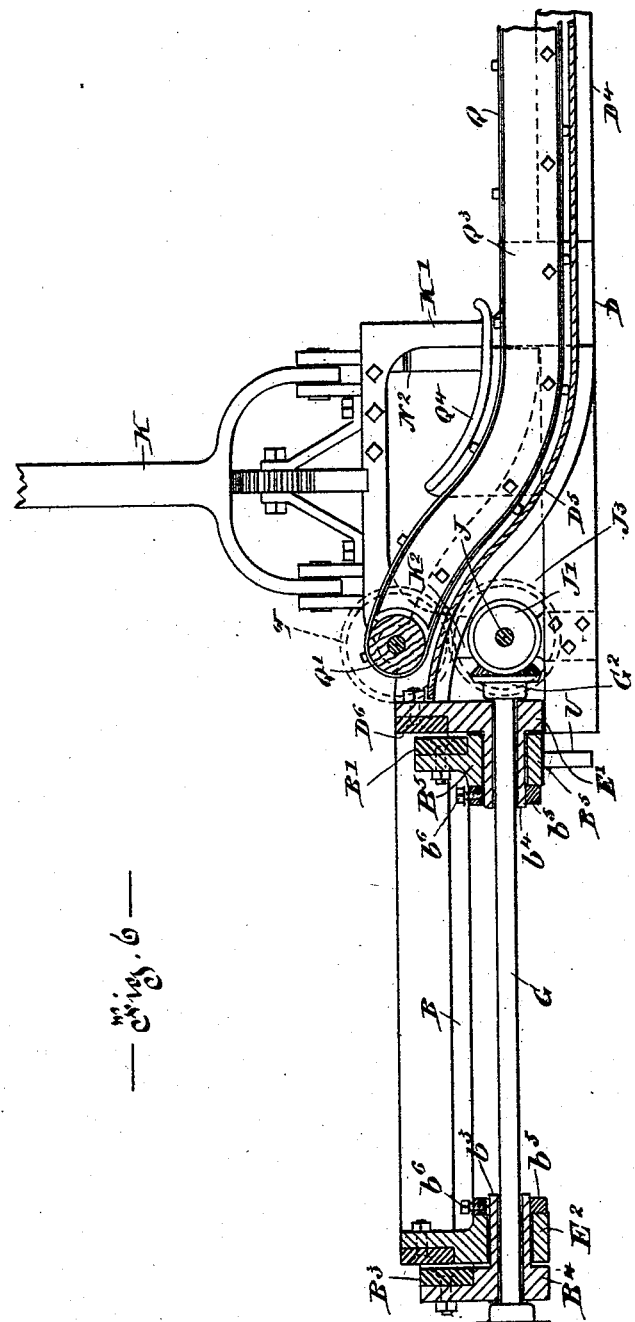

UNITED STATES PATENT OFFICE.

THOMAS JOHN HAMLET, OF TERREBONNE, CANADA, ASSIGNOR OF NINE-SIXTEENTHS TO CHARLES S. WALLACE, OF SAME PLACE.

HARVESTER.

SPECIFICATION forming part of Letters Patent No. 496,358, dated April 25, 1893.

Application filed March 29, 1892. Serial No. 426,971. (No model.)

*To all whom it may concern:*

Be it known that I, THOMAS JOHN HAMLET, of Terrebonne, in the county of Terrebonne and Province of Quebec, Canada, have invented certain new and useful Improvements in Harvesters; and I do hereby declare that the following is a full, clear, and exact description of the same.

My invention has for its object the improvement of grain binding harvesters of the class known as "platform binders" and it consists in constructing the harvester frame and rearranging the driving gear with a view to allowing the grain platform to be tilted independently of the main frame, and also in doing away with the elevation of the grain over the drive wheel and thereby discharging the grain sheaf clear of the machine. For full comprehension however of the invention, reference must be had to the annexed drawings in which like symbols indicate corresponding parts and wherein—

Figure 1 is a plan or top view of a harvester embodying my improvements, some of the parts being broken away and some shown in section. Fig. 2 is a side elevation of the harvester as seen from the stubble side of the machine. Fig. 3 is a transverse vertical section of the harvester on line $x\ x$ Fig. 1. Fig. 4 is a longitudinal section of the harvester on line $y\ y$ Fig. 1, some of the parts being broken away. Fig. 5 is a sectional view similar to Fig. 4 but confined chiefly to the grain platform, showing it in a tilted position. Fig. 6 is a transverse vertical section of the harvester on line $z\ z$ Fig. 1, some of the parts being broken away.

A is the driving wheel from the axle A' of which the main frame B is suspended at its forward end in the usual way by means of curved rack yokes C. This main frame B incloses the driving wheel and is rigidly constructed throughout, its rear end extending a little beyond the rear side of the grain platform frame and being supported by a caster wheel $b$ in the usual way.

The grain platform frame D as shown in Figs. 1 and 6 is formed separately from the main frame B and pivotally connected therewith instead of forming an integral part of it as heretofore.

In plan view the grain platform frame D is an oblong rectangle with front, rear and end bars with its inner or stubble end portion partially overlapping the rear portion of the main frame B the grainward side B' of which has two depressions $B^2\ B^2$ (shown in Fig. 5) formed in it to allow the front and rear bars of the frame D to work in. The depressions $B^2\ B^2$ are preferably formed by severing the main frame at such points, removing sufficient portions of the metal to leave openings of the required size and connecting the severed part by means of U-shaped yokes U U bolted in place.

In side elevation the frame D is horizontal for the extent of the portion overlapping the main frame (which overlapping portion constitutes an upward "set"), as is also that portion extending from its grainward end stubbleward to the grainward foot portion K' of the reel frame K, the levels of the two portions being respectively above and below that of the main frame, and the intermediate connecting portion taking the form of a reverse curve. At the point of junction of the curved portion $D^5$ with the overlapping part of the front and rear bars, a transverse connecting bar $D^6$ is arranged between such front and rear bars, and from the center of such transverse bar $D^6$ and that of the stubbleward end bar, respectively, supporting arms or blocks E' $E^2$, bolted to such bars, project downward and are pivotally connected with the side bars of the main frame preferably in the following manner:—The stubbleward side bar $B^3$ of the main frame has bolted to it a downwardly projecting arm $B^4$ having a grainwardly projecting bearing $b^3$ to form an axis for the supporting block $E^2$ which is bored to fit such bearing, and the block E' has a stubbleward projecting bearing $b^4$ similar to $b^3$ furnishing an axis to fit within a bearing formed in a downwardly projecting arm $B^5$ from the stubbleward side bar B' of the main frame, this reversed disposition of the bearings $b^3\ b^4$ being to allow the more ready connection of the grain platform with the main frame, the two being held against disconnection preferably by means of collars $b^5$ fixed in place on the ends of the bearings $b^3\ b^4$ by set screws $b^6$. The grainward end of the grain platform frame is supported pivotally by the usual grain wheel arrangement W which requires no special description other than to say that the pivoting axis of the frame must at this end be kept at the same level as, or in line with, the pivoting axis of the stubbleward end as before described.

The grain platform being capable of an independent tilting action it is necessary that special gearing be provided for operating the cutter knife from the usual counter shaft F driven in the usual way from the main shaft A and also that the shaft for conveying motion to the reel be provided with a pivoted instead of rigid bearing besides connecting the diagonal bracing rod between the main frame and the grain platform in such a way that rigidity will be maintained without interference with the tilting action of the grain platform, which parts and their arrangement I will now describe: The bearings $b^3 b^4$ of the stubbleward end of the grain platform frame above mentioned and the blocks from which they project are bored horizontally in the axis of said bearings to carry a transverse shaft G having on each end bevel gears $G'$ $G^2$ with the former of which a bevel gear $H^2$ on one end of a shaft H mounted in bearings $h\ h$ on the side bar $B^2$ of the main frame and carrying another bevel gear $H'$ at its opposite end, works, this last bevel gear $H'$ meshing with a bevel gear $F'$ on the stubbleward end of the counter shaft F. The gear $G^2$ on the grainward end of the shaft G meshes with a bevel gear $J'$ mounted on a shaft J carried transversely of the grain platform in bearings formed respectively in a hanger $J^2$ projecting downwardly from the rear side bar of the grain platform frame, and the downwardly projecting front foot portion $K^2$ of the reel frame K. The front end of the shaft J carries a crank disk $J^3$ from which the cutter knife M is operated through the connecting rod or pitman $J^4$. The finger bar has bolted to it the foot portions $K'\ K^2$ of the reel frame K and is in turn bolted to the face of the front side bar of the grain platform frame.

The shaft L, for operating the reel, instead of being held at its lower end in a rigid bearing as formerly, has its lower end carried in a vertically inclined bearing carried by an arm $L^2$ projecting up from a sleeve loosely mounted and held in place upon the grainward end of the counter shaft F.

The usual diagonal bracing stay N between the main frame and the grain platform is provided with a midway rigid support $N'$ projecting from the grainward side bar of the main frame, and has the end to be connected with the grain platform, forked to receive a slotted bracket $N^2$ carried rigidly on the front face of the grain platform, and furnishing a segmental slot $N^3$ through which a pin $n$ in the forked end of the stay passes, this form of connection allowing the free tilting of the grain platform without loss of rigidity. The bracket $N^2$ is recessed at its lower end and secured in place as shown in Fig. 4, in such a way as not to interfere with the operation of the cutter knife.

The tilting of the grain platform is performed by means of a hand lever P pivoted at $p$ to the grainward side bar of the main frame and operating to raise or lower the front side of the platform through a rod $P'$, bell crank levers $P^2$ pivoted at $p'$ to the main frame, and link $P^3$, the hand lever P being provided with the usual locking bar and notched segment for holding it in any desired position.

The stubbleward and grainward end rollers $Q'\ Q^2$ of the grain carrier Q have their bearings respectively in the front and rear bars of the grain platform frame and in the grainward ends of the usual guiding and supporting slats $Q^3\ Q^3$ carried on the inside faces of the front and rear bars and the carrier is curved to correspond with the shape of such bars, the roller $Q'$ being operated by gears $q$ and $j$ mounted respectively at the rear ends of said roller and the shaft J. Upper curved and overlapping guide bars $Q^4 Q^4$ are arranged on the upper edges of the front and rear bars to impart an easy curve to the carrier Q.

The grain platform frame having an upward "set," enables the cutting table (i. e. the finger bar and knife) to be let down as close to the ground as may be at any time required and still allow room for the binder packer arms to work without lowering the main frame so much as to render the packer arms liable to strike the ground in passing over a ditch; or if desired the upward "set" could be made in the main frame, at the grainward end commencing a little in rear of the main driving wheel, in which case however a binder having a downward action would have to be used.

What I claim is as follows:

1. In a harvester, the combination with the main frame to which the drive pole is attached and the grain platform frame the latter having an upward "set" at its stubble end which overlaps the main frame, and an intermediate transverse bar, of central pivotal connections between the side bars of the main frame and the stubble end bar and said transverse bar of the grain platform frame a bracing bar rigidly secured at one end to the main frame and held in a fixed position, and a sliding connection between its opposite end and the grain platform frame.

2. In a harvester, the combination with the main frame, having depressions in its grainward side bar, and the grain platform frame having an upward "set" at its stubbleward end, which overlaps the main frame, and an intermediate transverse bar—of supporting blocks situated centrally of and projecting downwardly from the said intermediate transverse and stubbleward end bars of said grain platform frame, and hangers projecting downwardly from the grainward and stubbleward side bars of the main frame and pivotal connections between said supports and hangers, as set forth.

3. In a harvester, the combination with the main frame, having depressions in its grainward side bar, and the grain platform frame having an upward set at its stubbleward end, which overlaps the main frame, and an intermediate transverse bar,—of supporting blocks $E'$ $E^2$ situated centrally of and projecting downwardly from the said intermediate transverse and stubble end bars of said grain platform frame, and hangers $B^4$ $B^5$ projecting downwardly from the grainward and stubbleward side bars of the main frame, the hangers $B^4$ and blocks $E^2$ respectively having inwardly projecting spindle bearings $b^3$ $b^4$ and the block $E'$ and hanger $R^5$ being bored to fit such spindle bearings, and means for holding the parts in place as set forth.

4. In a harvester, the combination with the main frame, the main driving wheel and counter shaft rotated from such wheel and connecting with the reel operating mechanism, of the grain platform pivotally connected with the main frame, a shaft, G, extending through the pivotal connections between the two frames and within the axis of such pivotal connection, and connecting gear at one end between such shaft G and the counter shaft, and at the other end between such shaft G and the cutter knife as set forth.

5. In a harvester, the combination with the main frame, the main driving wheel and counter shaft rotated from such wheel and connected with the reel operating mechanism, of the grain platform pivotally connected with the main frame, a shaft, G, extending through the pivotal connections between the two frames, a transverse shaft, J, extending across the grain platform frame and connecting gear between the shafts G and J and between such shafts and the counter shaft and cutter knife respectively, as set forth.

6. In a harvester, the combination with the main frame, the main driving wheel and counter shaft rotated from such wheel and connected with the reel operating mechanism, of the grain platform pivotally connected with the main frame, a shaft, G, extending through the pivotal connections between the two frames, a transverse shaft J, extending across the grain platform frame, the grain carrier Q and its rollers $Q'$ $Q^2$ and connecting gear between said shafts and the said counter shaft and between the shaft J and the roller $Q'$ as set forth.

7. In a harvester, the combination with the main frame, and grain platform frame, of a bracing bar rigidly secured at one end to the main frame and held in a fixed position, and a sliding connection between its opposite end and the said grain platform frame as set forth.

8. In a harvester, the combination with the main frame, and grain platform frame, of a bracing bar rigidly secured at one end to the main frame and held in a fixed position by a midway support from said frame, and a sliding connection, between its opposite end and the said grain platform frame as set forth.

9. In a harvester, the combination with the main frame and grain platform, frame, of a bracing bar rigidly secured to the main frame, a slotted bracket rigidly secured to the grain platform frame and a pin connection between the free end of said brace and said bracket for the purpose set forth.

Terrebonne, February 17, 1892.

THOMAS JOHN HAMLET.

In presence of—
JOSEPH NICKEL,
C. S. WALLACE.